United States Patent [19]
Obayashi et al.

[11] 4,340,706
[45] Jul. 20, 1982

[54] ALKALI METAL ACRYLATE OR AMMONIUM ACRYLATE POLYMER EXCELLENT IN SALT SOLUTION-ABSORBENCY AND PROCESS FOR PRODUCING SAME

[75] Inventors: Shigeji Obayashi, Akashi; Morio Nakamura; Koichi Fujiki, both of Kakogawa; Takushi Yamamoto, Kobe, all of Japan

[73] Assignee: Seitetsu Kagaku Co., Ltd., Hyogo, Japan

[21] Appl. No.: 209,174

[22] Filed: Nov. 21, 1980

[30] Foreign Application Priority Data

Mar. 19, 1980 [JP] Japan ................................ 55/34967

[51] Int. Cl.$^3$ ......................................... C08F 220/06
[52] U.S. Cl. .................................. 526/207; 525/343; 525/383; 526/216; 526/240; 526/311
[58] Field of Search ............... 526/207, 216, 240, 311; 525/329, 385, 343, 359, 383; 260/29.6 H

[56]  References Cited
U.S. PATENT DOCUMENTS

| 3,284,393 | 11/1966 | Vanderhoff et al. | 526/207 |
| 3,711,323 | 1/1973 | Heap et al. | 526/240 |
| 4,093,776 | 6/1978 | Aoki et al. | 526/207 |
| 4,189,559 | 2/1980 | Bueltjer et al. | 526/207 |

Primary Examiner—Harry Wong, Jr.
Attorney, Agent, or Firm—Pollock, Vande Sande & Priddy

[57] ABSTRACT

An alkali metal acrylate polymer obtained by suspending an aqueous solution of acrylic acid and an alkali metal acrylate in an alicyclic or aliphatic hydrocarbon solvent containing a surfactant having an HLB value of 8–12 and subjecting the suspension to inverse suspension polymerization in the presence of a water-soluble radical polymerization initiator has a much higher water-absorbency and particularly salt solution-absorbency than known ones. If said polymer is crosslinked with a crosslinking agent, its stability in the fluid-absorbed state for a long period of time is improved and the absorption rate when absorbing water is also improved.

25 Claims, No Drawings

ALKALI METAL ACRYLATE OR AMMONIUM ACRYLATE POLYMER EXCELLENT IN SALT SOLUTION-ABSORBENCY AND PROCESS FOR PRODUCING SAME

This invention relates to a water-absorbent resin, and to a process for producing an alkali metal acrylate or ammonium acrylate polymer having excellent water-absorbency and particularly salt solution-absorbency.

Water absorbent resins are used in the field of sanitation as menstrual articles, diaper, disposable house-cloth and the like and in the field of agriculture and horticulture as water retentive material. Further, they are useful in other various fields such as coagulation of sludges, prevention of dew condensation on the construction materials, dehydration of oils and so on. As this type of water-absorbent resin, there are known carboxymethyl cellulose, partially crosslinked polyethylene oxide, hydrolyzate of starch-acrylonitrile graft copolymer, partially crosslinked polyacrylic acid salt and the like. However, carboxymethyl cellulose and partially crosslinked polyethylene oxide have such a low absorbency that deionized water can be absorbed in an amount of at most 30 times the weight of polymer itself.

Although the hydrolyzate of starch-acrylonitrile graft copolymer has a relatively high deionized water-absorbency corresponding to 300–500 times its own weight, the saline solution-absorbency of the hydrolysate is only about 30–40 times its own weight and the product cannot be stored for a long period of time because the starch, the main component, rots. The partially crosslinked polyacrylic acid salt is not greatly different from the above-mentioned hydrolyzate of starch-acrylonitrile graft copolymer in absorbency. That is, none of these resins can be said to have a sufficiently high absorbency. Practically speaking, in the usages concerned with sanitation, for example, fluids to be absorbed such a urine and catamenial blood contain electrolytes such as sodium chloride, calcium chloride and the like. Further, in the case of agricultural and horticultural usages, the soil contains electrolytes including fertilizer components. Therefore, a water-absorbing material having a high absorbency not only to deionized water but also to aqueous electrolyte solution is needed. It is obvious, accordingly, that the field of application of water-absorbent resins will be broadened by developing a polymer having an excellent salt solution-absorbency.

As mentioned above, a variety of polymers are known as water-absorbent resin. The present inventors have considered that it is advantageous to produce a water-absorbent resin by using acrylic acid as a starting material because it has a constant quality and is readily available commercially. Based on this consideration, detailed studies have been carried out.

As the process for polymerizing acrylic acid and an alkali acrylate, there are been hitherto known various processes such as bulk polymerization, aqueous solution polymerization, spray polymerization, inverse emulsion polymerization, inverse suspension polymerization and the like. In the processes other than the inverse emulsion polymerization and inverse suspension polymerization, however, the polymerization heat is difficult to remove and the viscosity of polymerization mixture becomes too high to carry out the production in a general polymerizer. Further, a powdery product is difficult to obtain by these processes.

An example of the inverse emulsion polymerization process is mentioned in Japanese Patent Publication No. 10,644/59 (U.S. Pat. No. 3,284,393). When, for example, acrylic acid is used as the starting material, the polymer obtained is insoluble in water and does not exhibit such an absorbency that the polymer can be called a water-absorbent resin even if it is neutralized with an alkali such as sodium hydroxide or the like. As a process for producing an acrylic acid-alkali metal acrylate polymer having a water-absorbability, the inverse suspension polymerization process mentioned in Japanese Patent Publication No. 30,710/79 can be referred to, according to which a water-absorbent resin capable of absorbing 400–500 times its own weight of deionized water is obtained by polymerizing an aqueous solution of acrylic acid and an alkali metal acrylate having a monomer concentration of 40% by weight or more and containing a water-soluble radical polymerization initiator in a petroleum type aliphatic hydrocarbon solvent in the presence of a sorbitan fatty acid ester having an HLB value of 3–6. According to the measurement of the present inventors, however, the saline solution-absorbency of said water-absorbent resin is as low as 35–50 times its own weight.

In general, the polymer obtained by the inverse suspension polymerization of acrylic acid and an alkali metal acrylate is considered to exhibit a water-absorbency owing to the hydrophilic group contained in its structural unit and the complicated entanglement of the high polymer molecular chains as well as to the pseudo-crosslinked structure which the polymer contains in a very small amount.

In order to obtain a high polymer with an emulsion or suspension polymerization system including an inverse emulsion or suspension system, it is conventional to increase the monomer concentration, to decrease the concentration of polymerization initiator, to lower the polymerization temperature, and to keep the monomer droplets as fine as possible. Though the same conditions as above are considered also applicable to the production of a high polymer by the inverse suspension polymerization of acrylic acid and an alkali metal acrylate, it is indispensable to keep the degree of polymerization high and, at the same time, to give the polymer an appropriate amount of pseudo-crosslinked structure in order to impart an excellent absorbency to the polymer produced by the inverse suspension polymerization of acrylic acid and an alkali metal acrylate. One of the methods of forming a slight amount of pseudo-crosslinked structure is to increase the monomer concentration of the aqueous monomer solution to more than 40% by weight in the inverse suspension system. In this case, however, the polymer obtained cannot be said to have a sufficient absorbency because it can absorb about 400–500 times its own weight of deionized water and only 35–50 times its own weight of saline solution.

The present inventors have conducted extensive studies about a process for producing a polymer much superior in absorbency to the existing water-absorbent resins. As a result, the inventors have paid their attention to the point that acrylic acid and an alkali metal acrylate or ammonium acrylate form a high polymer in a short period of time while forming pseudo-crosslinkages and entanglements of molecular chains in the process of polymerization and the point that an aqueous solution of acrylic acid and an alkali metal acrylate forms a relatively stable suspension phase even when using a surfactant having an HLB value higher than 3–6, which has hitherto been considered suitable for the case of W/O type inverse suspension phase, whereby it has surprisingly been found that there is obtained a polymer having so markedly excellent an absorbency as to be able to absorb at least 800 times it own weight of deionized water and at least 80 times its own weight of saline solution by suspending an aqueous solution of acrylic acid and an alkali metal acrylate or ammonium acrylate in an alicyclic or aliphatic hydrocarbon solvent containing a surfactant having an HLB value of 8–12, subjecting it to inverse suspension polymerization in the presence of a water-soluble radical polymerization initiator and, if necessary, carrying out a crosslinking reaction with a crosslinking agent.

In polymerization reactions, there is generally observed the so-called Trommsdorff effect that the viscosity of the polymerization system increases and the diffusibility of the polymer decreases, with the progress of polymerization, and hence, the rate and degree of polymerization increase rapidly. The same tendency as above is also observed in the inverse suspension polymerization of an aqueous solution of acrylic acid and an alkali metal acrylate or ammonium acrylate, and the rate of polymerization in said polymerization system is so high as to emit the heat of polymerization rapidly which causes a pseudo-crosslinking reaction. It has been thought that a water-absorbent polymer is obtained owing to these phenomena. The present inventors have paid their attention to the point that, if the quantities of polymerization heat generated in unit period of time are the same, the droplet diameter of the aqueous monomer solution is in a contradictory relation to the amount of polymerization heat released into the solvent layer, so that the degree of polymerization of the resulting polymer would become higher and the pseudo-crosslinking reaction would take place more easily by developing the Trommsdorff effect more conspicuously, which is caused by increasing the monomer droplet diameter within the range in which the emulsion stability is not adversely affected thereby and reducing the quantity of the heat released per unit weight of the monomer droplet, and have consequently accomplished a process for producing a high absorbency acrylic acid salt polymer by using a surfactant having an HLB value of 8–12 which is generally considered to be unsuitable for inverse suspension polymerization system and inverse emulsion polymerization system.

It is an object of this invention to provide an acrylic acid salt polymer having excellent water-absorbency and particularly salt solution-absorbency.

It is another object of this invention to provide a process for producing said polymer.

Other objects and advantages of this invention will become apparent from the following description.

According to this invention, there is provided a process for producing an alkali metal acrylate or ammonium acrylate polymer having excellent salt solution-absorbency, characterized by suspending an aqueous solution of acrylic acid and an alkali metal acrylate or ammonium acrylate, the mole ratio of the acrylic acid to the alkali metal acrylate or ammonium acrylate being 50/50 to 2/98, in an alicyclic or aliphatic hydrocarbon solvent containing a surfactant having an HLB value of 8–12, subjecting the resulting suspension to inverse suspension polymerization in the presence of a water-soluble radical polymerization initiator and, if necessary, crosslinking the resulting polymer with a crosslinking agent.

The process of this invention is an unexpected process, and the polymer obtained is a novel resin having such great water-absorbency as to be unexpected from conventional water-absorbent resins.

The acrylic acid monomer used in the polymerization has to be neutralized partially with an alkali such as sodium hydroxide, ammonium hydroxide, potassium hydroxide or the like, and the appropriate degree of neutralization is 50–98 mole percent. If the degree of neutralization is less than 50 mole percent, the pseudo-crosslinking reaction takes place to an extremely high extent and the absorbency of the polymer obtained decreases greatly. If the degree of neutralization exceeds 98 mole percent, the major part of the polymer becomes water-soluble.

The solvent used in this invention is an alicyclic hydrocarbon or an aliphatic hydrocarbon. As said alicyclic hydrocarbon, preferred are cyclopentane, methylcyclopentane, cyclohexane, methylcyclohexane and the like. As said aliphatic hydrocarbon, there are preferably n-pentane, n-hexane, n-heptane, ligroin and the like. If an aromatic hydrocarbon such as benzene, toluene, xylene or the like is used as the solvent, the resulting polymer becomes a mass, and a step of pulverization is required for obtaining a granular or powdery polymer, so that they cannot be said to be practical solvents.

The radical polymerization initiator must be water-soluble, and the generally used water-soluble radical polymerization initiators such as potassium persulfate, ammonium persulfate and the like are suitably used. They may be combined with a sulfite or the like to form a redox type initiator. However, the use of oil-soluble radical polymerization initiators is not desirable because they generally form a water-soluble polymer. The water-soluble radical polymerization initiator is used preferably in an amount of 0.005–1.0 mole percent based on the total amount of the monomers. If it is less than 0.005 mole percent, the polymerization reaction takes a very long time. If it is more than 1.0 mole percent, a polymer having a low absorbency is formed.

As the surfactant used in the inverse suspension polymerization of this invention, any surfactant may be used so far as its HLB is 8–12, though a sorbitol fatty acid ester, a sorbitol fatty acid ester ether, a sorbitan fatty acid ester, a sorbitan fatty acid ester ether and the like give particularly good results. If acrylic acid and an alkali acrylate are polymerized in the inverse suspension system with said surfactants, there can be obtained a high water-absorbent polymer capable of absorbing at least 800 times its own weight of deionized water and at least 80 times its own weight of saline solution in the form of uniform granule.

In general, the functions of the surfactant used in the polymerization, are that the polymerization mixture forms a stable emulsion, the surfactant does not retard the polymerization reaction, and uniform polymer particles are formed without coagulation nor separation. The above-mentioned surfactants used in this invention sufficiently fulfil these functions.

When the polymerization is carried out by using a surfactant having an HLB value of less than 8 such as sorbitan monostearate, a stable emulsion is formed but the deionized water-absorbency of the polymer obtained is as low as 400–500 times its own weight and the saline solution-absorbency thereof is as low as 35–50 times its own weight. Further, the polymer formed is in the form of a powder having too small a particle diameter, so that the polymer is lost as dust at the time of drying or practical use. Though reducing the amount of surfactant used or descreasing the power of stirring the polymerization mixture may be thought of for overcoming the above-mentioned faults, the absorbency and particle diameter of the polymer formed are substantially the same as those mentioned above even if the amount of surfactant used is reduced to the neighborhood of its critical micelle concentration.

Further, if the amount of the surfactant used is reduced below the critical micelle concentration or the polymerization is carried out under an insufficient stirring conditions, a lump of polymer is formed or the polymer obtained is uneven in absorbency.

On the other hand, if a surfactant having an HLB value exceeding 12 is used, the polymer formed during the polymerization becomes a block and has such a low absorbency that it cannot be said to be a practical water-absorbent resin.

The amount of the surfactant used is preferably in the range of 1–15% by weight based on the weight of the monomers. If it is less than 1% by weight, the emulsion cannot be kept in a stable state. If more than 15% by weight of the surfactant is used, no good result corresponding thereto is obtained, and hence, it is not economical.

The polymerization temperature is preferably in the range of from 20° to 100° C. and more preferably from 40° to 80° C. If the polymerization is carried out at a temperature higher than 100° C., the amount of pseudo-crosslinkage becomes extremely high, and on the contrary, the absorbency of the polymer decreases. If the polymerization is carried out at a temperature lower than 20° C., the polymerization rate is reduced and, in addition, water-soluble polymer is formed.

A water-absorbent resin suitable for usages necessitating a stability in the fluid-absorbed state for a long period of time or a high rate of absorption can be obtained by crosslinking the acrylic acid salt polymer of this invention in the presence of a cross-linking agent.

As the crosslinking agent for compounds containing a carboxyl group, a variety of substances are known. In order to improve the stability in the water-absorbed state and to improve the absorption rate without greatly decreasing the absorbency which is the characteristic feature of the water-absorbent resin, a water-soluble diglycidyl ether compound, a haloepoxy compound, an aldehyde compound and the like may be used as the crosslinking agent, among which the water-soluble diglycidyl ether compounds are particularly preferred. The water-soluble diglycidyl ether compound includes, for example, (poly)-ethylene glycol diglycidyl ether, (poly)-propylene glycol diglycidyl ether, (poly)-glycerin diglycidyl ether, and the like. The haloepoxy compound includes, for instance, epichlorohydrin, α-methylepichlorohydrin and the like. The aldehyde compound includes, for example, glutaraldehyde, glyoxal, thiodiacetoaldehyde and the like. These compounds are all usable in this invention. By carrying out the crosslinking reaction with the above-mentioned crosslinking agents, the water absorption rate and the stability in the fluid-absorbed state can be improved without greatly decreasing the absorbency. Particularly, when ethylene glycol diglycidyl ether is used, a good result is obtained. Further, by carrying out the crosslinking reaction, the formation of unswollen powder lump, which tends to be caused at the beginning stage of water absorption, can be prevented and the rate of absorption when absorbing water can also be improved. When a powdery material has absorbed moisture, agglomeration of particles tends to occur to injure the flow property of the powdery material. According to this invention, this fault can also be overcome and a powdery material having a good flow property can be obtained.

The amount of the crosslinking agent used may vary depending upon the kind of the crosslinking agent. When, for example, a water-soluble diglycidyl ether compound is used, the amount thereof is preferably in the range of 0.005–5.0% by weight based on the weight of the monomers. If it is smaller than 0.005% by weight, the effect of the addition of the compound cannot be obtained. If the amount is larger than 5.0% by weight, there is obtained a polymer having so high a degree of crosslinking that the absorbency of the polymer is markedly lowered.

The crosslinking agent may be added at any time after the completion of the polymerization to develope the above-mentioned performances fully. For example, a crosslinking agent may be added to the polymerization mixture and the resulting mixture is heat-treated, or the polymerization mixture may be poured into a solvent, such as a lower alcohol or acetone, containing a crosslinking agent. The mixture thus obtained may be heat-treated as such, or it is also possible to heat and evaporate the mixture in the form of a slurry to dryness to remove the solvent and simultaneously effect the crosslinking reaction.

The characteristic feature of this invention consists in that a surfactant having an HLB value of 8–12, which has hitherto been considered unsuitable for inverse suspension system or inverse emulsion system, is used. It also consists in that the polymer formed by the polymerization is much superior in absorbency to the hitherto known water-absorbent resins, that a uniform granular polymer can be obtained, and that a polymer having an improved stability of absorbency in the fluid-absorbed state for a long period of time and an improved absorption rate can be obtained by using a water-soluble diglycidyl ether compound or the like as a crosslinking agent.

According to this invention, it has become possible to produce a water-absorbent resin having a deionized water-absorbency corresponding to at least 800 times its own weight and a saline solution-absorbency corresponding to at least 80 times its own weight and having an improved stability in the powdery state and in the water-absorbed state for a long period of time. This is an excellent effect which has hitherto not been known at all.

The term "absorbency" used herein means a value determined according to the following procedure: In the case of deionized water-absorbency, 2 liters of deionized water and 1 g of the dried polymer were placed in a 3-liter beaker, and water was absorbed by the polymer for 30 minutes with stirring, after which the polymer was collected by filtration with a 100-mesh metallic wire gauze, the volume of the swollen polymer obtained as a filtered cake was measured by means of a messcylinder, and the value was taken as the deionized water-absorbency.

In the case of saline solution-absorbency, 200-ml of saline solution (0.9% by weight aqueous sodium chloride solution) and 1 g of dried polymer were placed in a 300-ml beaker and the solution was absorbed by the polymer for 30 minutes with stirring, after which it was filtered with a 200-mesh metallic wire gauze, the volume of the swollen polymer obtained as a filtered cake was measured by means of a messcylinder and the value was taken as the saline solution-absorbency.

This invention will be explained below referring to Examples and Comparative Examples. This invention is not limited to the Examples.

EXAMPLE 1

In a 200-ml flask was placed 39.1 g of acrylic acid having a purity of 99.8% by weight. While cooling it, 76.5 g of 22.6% by weight aqueous sodium hydroxide solution was dropped thereinto with stirring to neutralize the acrylic acid to an extent of 80 mole percent. Then, 0.13 g of potassium persulfate was added and stirring was continued at room temperature to dissolve it.

213 g of cyclohexane and 1.9 g of sorbitan monolaurate having an HLB value of 8.6 were charged into a 500-ml flask equipped with a reflux condenser, the inner atmosphere of which had previously been replaced with nitrogen, and the surfactant was dissolved at room temperature with stirring. Then, the above-mentioned aqueous solution of partially neutralized acrylic acid salt was dropped thereinto and suspended therein. The inner atmosphere was again replaced with nitrogen sufficiently and then the temperature was raised, and polymerization reaction was carried out for 3 hours while keeping the bath temperature at 55°–60° C.

By evaporating the polymerization mixture thus formed to dryness under reduced pressure, 48.0 g of a granular dry polymer was obtained. The deionized water-absorbency of the polymer corresponded to 1,250 times in its own weight and the saline solution-absorbency corresponded to 120 times in its own weight. As measured after 5 minutes, the deionized water-absorbency was 300 times and saline solution-absorbency was 25 times. In the powdery state, the polymer exhibited no change in absorbency over a long period of time.

EXAMPLE 2

The same procedure as in Example 1 was repeated to effect partial neutralization, polymerization and evaporation to dryness, except that the surfactant was replaced by oxyethylenesorbitan monostearate ether (EO 3-mole adduct) having an HLB value of 9.0, whereby 47.5 g of a granular dry polymer was obtained. The deionized water-absorbency was 1,050 ml/g-polymer and the saline solution-absorbency was 100 ml/g-polymer. In the powdery state, no change in absorbency was observed for a long period of time.

EXAMPLE 3

The same procedure as in Example 1 was repeated to carry out partial neutralization, polymerization, and evaporation to dryness, except that the solvent for polymerization (cyclohexane) was replaced by n-hexane and the amount of polymerization initiator was altered to 0.39 g, whereby 48.4 g of a granular dry polymer was obtained. The deionized water-absorbency was 1,050 ml/g-polymer, and the saline solution absorbency was 80 ml/g-polymer. In the powdery state, no change in absorbency was observed over a long period of time.

EXAMPLE 4

The same procedure as in Example 1 was repeated to carry out partial neutralization, polymerization and evaporation to dryness, except that acrylic acid was neutralized to an extent of 65 mole percent with 61.0 g of 9.8% by weight aqueous ammonia solution, whereby 44.5 g of a granular dry polymer was obtained. The deionized water-absorbency was 1,100 ml/g-polymer, and the saline solution-absorbency was 105 ml/g-polymer. In the powdery state, no change in absorbency was observed for a long period of time.

EXAMPLE 5

In 4.0 g of water was dissolved 0.4 g of ethylene glycol diglycidyl ether (molecular weight 174). The resulting solution was added to the polymer solution obtained by the same procedure as in Example 1, and the resulting mixture was subjected to crosslinking at 50° C. for 3 hours. By evaporating the resulting reaction mixture to dryness under reduced pressure, 48.5 g of a granular dry polymer was obtained. The deionized water-absorbency was 900 ml/g-polymer, and the saline solution-absorbency was 85 ml/g-polymer. As measured after 5 minutes, the deionized water-absorbency became 550 ml/g-polymer and the saline solution-absorbency was 45 ml/g-polymer. The water absorption rate was high in all the cases. In the powdery state and in the water-absorbed state, no change in absorbency was observed for a long period of time.

EXAMPLE 6

The same procedure as in Example 5 was repeated, except that the amount of ethylene glycol diglycidyl ether added was altered to 0.1 g to obtain 48.0 g of a granular dry polymer. The deionized water-absorbency was 1,150 ml/g-polymer, and the saline solution-absorbency was 105 ml/g-polymer. The water absorption rate was high in all the cases. In the powdery state and in the water-absorbed state, no change in absorbency was observed for a long period of time.

EXAMPLE 7

The same procedure as in Example 5 was repeated, except that the ethylene glycol diglycidyl ether was replaced by 0.4 g of glycerin diglycidyl ether, to obtain 48.7 g of a granular dry polymer. The deionized water-absorbency was 800 ml/g-polymer, and the saline solution-absorbency was 80 ml/g-polymer. The water absorption rate was high in all of the cases. In the powdery state and in the water-absorbed state, no change in absorbency was observed for a long period of time.

EXAMPLE 8

In 300 g of methanol was dissolved 0.4 g of ethylene glycol diglycidyl ether. The resulting solution was added to the polymer solution formed by carrying out polymerization in the same manner as in Example 1, and the polymerization mixture obtained was subjected to crosslinking reaction at 50° C. for 3 hours. By evaporating the reaction mixture to dryness under reduced pressure, 49.0 g of a granular dry polymer was obtained. The deionized water-absorbency was 1,000 ml/g-polymer, and the saline solution-absorbency was 90 ml/g-polymer. The water-absorption rate was high in all the cases. In the powdery state, no change in absorbency was observed for a long period of time.

EXAMPLE 9

The same procedure as in Example 8 was repeated to carry out polymerization and crosslinking reaction, except that the crosslinking reaction and a drying under atmospheric pressure were simultaneously carried out at 105° C., whereby 48.5 g of a granular dry polymer was obtained. The deionized water-absorbency was 940 ml/g-polymer, and the saline solution-absorbency was 87 ml/g-polymer. The water absorption rate was high in all of the cases. In the powdery state and in the water-absorbed state, no change in absorbency was observed for a long period of time.

EXAMPLE 10

The same procedure as in Example 8 was repeated, except that the ethylene glycol diglycidyl ether was replaced by 0.1 g of epichlorohydrin, whereby 48.0 g of a particulate dry polymer was obtained. The deionized water-absorbency was 900 ml/g-polymer, and the saline solution-absorbency was 85 ml/g-polymer. The water absorption rate was high in all of the cases. In the powdery state and in the water-absorbed state, no change in absorbency was observed for a long period of time.

COMPARATIVE EXAMPLE 1

The same procedure as in Example 1 was repeated to carry out partial neutralization, polymerization, and evaporation to dryness, except that the surfactant was replaced by 1.9 g of sorbitan monostearate having an HLB value of 4.7, whereby 48.0 g of a fine powder of a dry polymer was obtained. The deionized water-absorbency was 520 ml/g-polymer, and the saline solution-absorbency was 50 ml/g-polymer.

COMPARATIVE EXAMPLE 2

The same procedure as in Example 1 was repeated to carry out partial neutralization, polymerization and evaporation to dryness, except that the surfactant was replaced by 1.9 g of polyoxyethylene sorbitan monostearate ether (EO 21-mole adduct) having an HLB value of 14.9, whereby 48.7 g of a dry polymer in the form of an agglomerate lump was obtained. The polymer was substantially dissolved in either deionized water or saline solution.

COMPARATIVE EXAMPLE 3

The same procedure as in Example 1 was repeated to carry out partial neutralization, polymerization and evaporation to dryness, except that the solvent for polymerization was replaced by 213 g of toluene, whereby a dry polymer in the form of a block was obtained.

COMPARATIVE EXAMPLE 4

The same procedure as in Example 1 was repeated to carry out partial neutralization, polymerization and evaporation to dryness, except that the neutralization was effected to a full extent of 100% with 82.3 g of 26.3% by weight aqueous sodium hydroxide solution, whereby 49.8 g of a granular dry polymer was obtained. The deionized water-absorbency was 20 ml/g-polymer, and the saline solution-absorbency was 10 ml/g-polymer.

COMPARATIVE EXAMPLE 5

The same procedure as in Example 1 was repeated to carry out partial neutralization, polymerization and evaporation to dryness, except that the neutralization was effected to an extent of 30 mole percent with 62.7 g of 10.4% by weight aqueous sodium hydroxide solution, whereby 43.3 g of a granular dry polymer was obtained. The deionized water-absorbency was 120 ml/g-polymer and the saline solution-absorbency was at most 10 ml/g-polymer.

COMPARATIVE EXAMPLE 6

The same procedure as in Example 5 was repeated, except that the amount of ethylene glycol diglycidyl ether was altered to 3.9 g, whereby 51.0 g of a granular dry polymer was obtained. The deionized water-absorbency was 50 ml/g-polymer and the saline solution-absorbency was 10 ml/g-polymer.

COMPARATIVE EXAMPLE 7

The same procedure as in Example 5 was repeated, except that the amount of ethylene glycol diglycidyl ether was altered to 0.001 g, whereby 49.3 g of a granular dry polymer was obtained. The deionized water-absorbency was 1,150 ml/g-polymer, and the saline solution-absorbency was 120 ml/g-polymer. The addition of a crosslinking agent brought about no noticeable effect.

What is claimed is:

1. A process for producing an alkali acrylate polymer having excellent salt solution-absorbency, characterized by suspending an aqueous solution of acrylic acid and an alkali metal acrylate or ammonium acrylate, wherein the monomer concentration is at least 40% by weight, the mole ratio of the acrylic acid to said acrylate is 50/50 to 2/98, in an alicyclic or aliphatic hydrocarbon solvent containing a surfactant having an HLB value of 8–12 and subjecting it to inverse suspension polymerization in the presence of a water-soluble radical polymerization initiator.

2. A process according to claim 1, wherein the surfactant having an HLB value of 8–12 is sorbitan monolaurate.

3. A process according to claim 1 or 2, wherein the solvent is cyclohexane.

4. A process for producing an alkali acrylate polymer having excellent salt solution-absorbency, characterized by suspending an aqueous solution of acrylic acid and an alkali metal acrylate or ammonium acrylate, wherein the monomer concentration is at least 40% by weight, the mole ratio of the acrylic acid to said acrylate is 50/50 to 2/98, in an alicyclic or aliphatic hydrocarbon solvent containing a surfactant having an HLB value of 8–12, subjecting it to inverse suspension polymerization in the presence of a water-soluble radical polymerization initiator, thereafter adding a water-soluble diglycidyl ether, haloepoxy, or aldehyde cross-linking agent, subjecting the resulting mixture to crosslinking reaction.

5. A process according to claim 4, wherein the surfactant having an HLB value of 8–12 is sorbitan monolaurate.

6. A process according to claim 4 or 5, wherein the solvent is cyclohexane.

7. A process according to claim 4 or 5, wherein said crosslinking agent is ethylene glycol diglycidyl ether and it is used in an amount of 0.005–5.0% by weight based on the weight of the monomers.

8. The process of claim 1 or 4 wherein the amount of said surfactant is 1–15% by weight based on the weight of the monomers.

9. The process of claim 1 or 4 wherein the polymerization is carried out at temperatures of 20° to 100° C.

10. The process of claim 1 or 4 wherein the polymerization is carried out at temperatures of 40° to 80° C.

11. The process of claim 1 or 4 wherein said acrylate is selected from the group of sodium acrylate, potassium acrylate or ammonium acrylate.

12. The process of claim 1 or 4 wherein said solvent is selected from the group of cyclopentane, methylcyclopentane, cyclohexane, methylcyclohexane, n-pentane, n-hexane, n-heptane, or ligroin.

13. The process of claim 1 or 4 wherein said initiator is present in an amount of 0.005–1.0 mole perdent based on the total amount of monomers.

14. The process of claim 1 or 4 wherein said initiator includes potassium persulfate or ammonium persulfate.

15. The process of claim 1 or 4 wherein said surfactant is selected from the group of sorbitol fatty acid ester, sorbitol fatty acid ester ether, sorbitan fatty acid ester or sorbitan fatty acid ester ether.

16. The process of claim 4 wherein the amount of said crosslinking agent is 0.005–5% by weight based on the weight of the monomers.

17. The process of claim 4 or 16 wherein said crosslinking agent is selected from the group of (poly)-ethylene glycol diglycidyl ether, (poly)-propylene glycol diglycidyl ether, (poly)-glycerin diglycidyl ether, epichlorohydrin, α-methylepichlorohydrin, glutaraldehyde, glyoxal, or thiodiacetoaldehyde.

18. The process of claim 4 or 16 wherein said crosslinking agent includes diglycidyl ether.

19. The process of claim 4 wherein said crosslinking includes ethylene glycol diglycidyl ether.

20. The process of claim 1 wherein the amount of said surfactant is 1–15% by weight based on the weight of the monomers, the amount of said initiator is 0.005–1.0 mole percent based on the total amount of monomers, said acrylate is selected from the group of sodium acrylate, potassium acrylate, or ammonium acrylate, said solvent is selected from the group of cyclopentane, methyl cyclohexane, n-pentane, n-hexane, n-heptane, or ligroin, said initiator includes potassium persulfate or ammonium persulfate, said surfactant is selected from the group of sorbitol fatty acid ester, sorbitol fatty acid ester ether, sorbitan fatty acid ester or sorbitan fatty acid ester ether, and wherein the polymerization is carried out at temperatures of 20° to 100° C.

21. The process of claim 1 or 20 wherein said solvent includes cyclohexane, said surfactant includes sorbitan monolaurate, and wherein the polymerization is carried out at temperatures of 40° to 80° C.

22. The process of claim 4 wherein the amount of said surfactant is 1 to 15% by weight based on the weight of the monomers, the amount of said initiator is 0.005–1.0 mole percent based on the total amount of monomers, said acrylate is selected from the group of sodium acrylate, potassium acrylate, or ammonium acrylate, the solvent is selected from the group of cyclopentane, methylcyclohexane, n-pentane, n-hexane, n-heptane, or ligroin, said initiator includes potassium persulfate or ammonium persulfate, said surfactant is selected from the group of sorbitol fatty acid ester, sorbitol fatty acid ester ether, sorbitan fatty acid ester, or sorbitan fatty acid ester ether, the amount of said crosslinking agent is 0.005–5% by weight based on the weight of the monomers, said crosslinking agent is selected from the group of (poly)-ethylene glycol diglycidyl ether, (poly)-propylene glycol diglycidyl ether, (poly)-glycerin diglycidyl ether, epichlorohydrin, α-methyl epichlorohydrin, glutaraldehyde, glyoxal, or thiodiacetoaldehyde, and wherein the polymerization is carried out at temperatures of 20° to 100° C.

23. The process of claim 4 or 22 wherein said solvent includes cyclohexane, said surfactant includes sorbitan monolaurate, said crosslinking agent includes ethylene glycol diglycidyl ether, and wherein the polymerization is carried out at temperatures of 40° to 80° C.

24. An alkali acrylate polymer having excellent salt solution-absorbency produced by the process of claim 1 or 20.

25. An alkali acrylate polymer having excellent salt solution-absorbency obtained by the process of claim 4 or 22.

* * * * *